(12) United States Patent
Rawson

(10) Patent No.: US 7,316,389 B2
(45) Date of Patent: Jan. 8, 2008

(54) VIBRATION ISOLATION MEMBER

(75) Inventor: Scott A. Rawson, Lake City, PA (US)

(73) Assignee: Lord Corporation, Cary, NC (US)

( * ) Notice: Subject to any disclaimer, the term of this patent is extended or adjusted under 35 U.S.C. 154(b) by 885 days.

(21) Appl. No.: 09/829,883

(22) Filed: Apr. 10, 2001

(65) Prior Publication Data

US 2002/0145241 A1 Oct. 10, 2002

(51) Int. Cl.
*F16F 7/00* (2006.01)

(52) U.S. Cl. .................... 267/141.7; 267/141.5

(58) Field of Classification Search ............... 267/136, 267/140.13, 141, 141.2, 141.3, 141.4, 141.5, 267/141.7; 248/562, 610, 611, 612, 634, 248/635, 638

See application file for complete search history.

(56) References Cited

U.S. PATENT DOCUMENTS

| | | | | | |
|---|---|---|---|---|---|
| 2,131,840 | A | * | 10/1938 | La Chapelle | 12/53.5 |
| 2,367,830 | A | * | 1/1945 | Kubaugh | 267/141.7 |
| 2,538,658 | A | * | 1/1951 | Saurer | 264/262 |
| 2,538,955 | A | * | 1/1951 | Efromson et al. | 267/140.3 |
| 2,830,780 | A | | 4/1958 | Schloss | 248/22 |
| 2,890,846 | A | | 6/1959 | Schloss | 248/22 |
| 3,244,386 | A | * | 4/1966 | Bourgeois | 267/141.3 |
| 3,751,024 | A | * | 8/1973 | Pineau | 267/153 |
| 4,468,016 | A | | 8/1984 | Pineau | 267/141 |
| 4,826,145 | A | | 5/1989 | Moore et al. | 267/293 |
| 4,957,279 | A | | 9/1990 | Thorn | 267/140.5 |
| 5,017,328 | A | * | 5/1991 | Mazurek | 248/560 |
| 5,116,030 | A | * | 5/1992 | Nowak et al. | 267/140.4 |
| 5,121,905 | A | | 6/1992 | Mann et al. | 267/141.4 |
| 5,174,540 | A | * | 12/1992 | Gilliam | 248/635 |
| 5,295,671 | A | * | 3/1994 | Nakagaki et al. | 248/638 |
| 5,335,893 | A | | 8/1994 | Opp | 248/635 |
| 5,531,426 | A | * | 7/1996 | Bruhl | 267/140.12 |
| 5,580,028 | A | | 12/1996 | Tomczak et al. | 248/634 |
| 5,651,535 | A | | 7/1997 | David | 267/140.5 |
| 5,735,511 | A | | 4/1998 | Stöcker et al. | 267/140.13 |
| 5,788,206 | A | * | 8/1998 | Bunker | 248/634 |
| 5,845,895 | A | | 12/1998 | Nakada et al. | 267/140.13 |
| 5,876,023 | A | | 3/1999 | Hain et al. | 267/141.4 |
| 5,876,024 | A | | 3/1999 | Hain | 267/141.4 |
| 5,890,569 | A | | 4/1999 | Goepfert | 188/378 |
| 5,927,698 | A | * | 7/1999 | Miyoshi et al. | 267/140.13 |
| 5,979,884 | A | * | 11/1999 | Sato et al. | 267/140.13 |
| 6,065,742 | A | | 5/2000 | Whiteford | 267/140.5 |

OTHER PUBLICATIONS

"Isolator Mount, Threaded, Self-Locking" Shur-Lok International, S.A., Technical Publication, p. 19, SL2337, May 1998.

"Vibration, Shock and Motion Control Products for Sensitive Equipment, Shipping Containers and Aircraft Interiors" Lord Corporation Technical Publication Sep. 2000, GPS9/00-4M, PC6116.

* cited by examiner

*Primary Examiner*—Bradley King
(74) *Attorney, Agent, or Firm*—Edward F. Murphy, III

(57) ABSTRACT

A vibration isolation member comprising an inner member comprising an outer periphery having a first dimension; an outer member comprising a base and a shroud that extends away from the base, the shroud adapted to overlay the inner member, said shroud defining an inner periphery having a second dimension, the second dimension being less than the first dimension; and a resilient member constrained between the shroud and the inner member, whereby the vibration isolation member provides iso-elastic dynamic stiffness and an interference between the inner and outer members in the event of a failure of the resilient member.

10 Claims, 2 Drawing Sheets

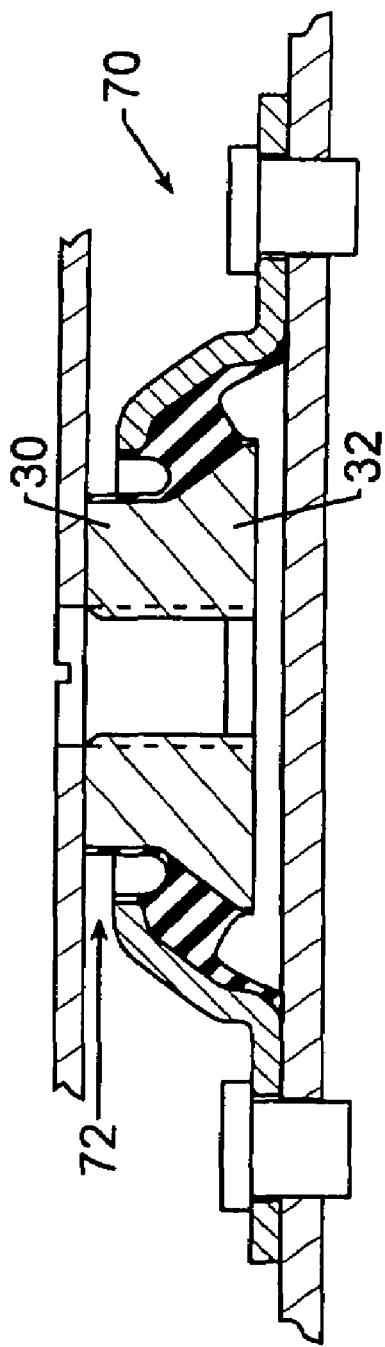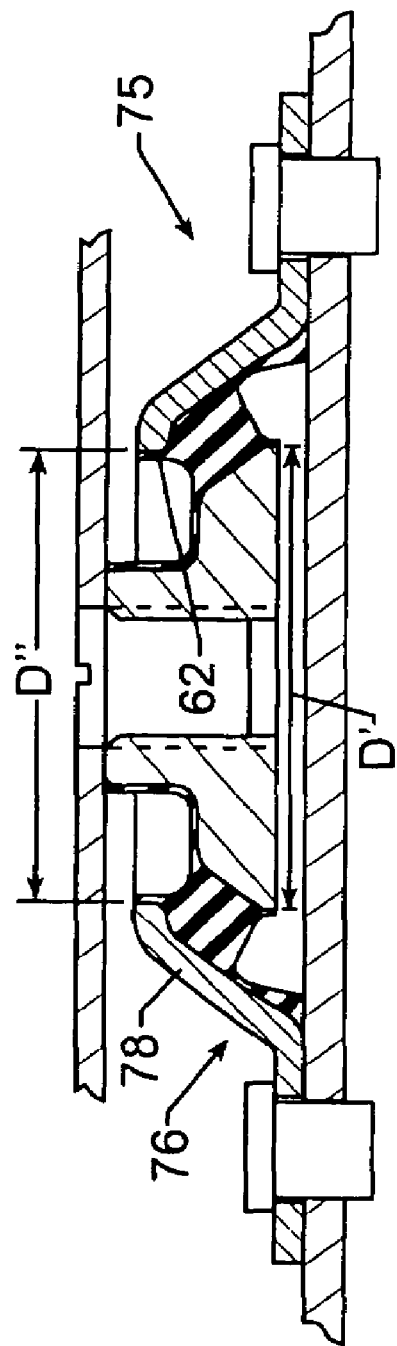

US 7,316,389 B2

VIBRATION ISOLATION MEMBER

FIELD OF THE INVENTION

The invention relates to a vibration isolation member and more particularly the invention relates to a vibration isolation member that provides substantially equal dynamic stiffness in radial and axial directions and comprises an outer member with an inner periphery, an inner member with an outer periphery and a resilient member joining the inner and outer members wherein the dimensions of the inner and outer peripheries provide for an interference therebetween in the event of a failure of the elastomer.

BACKGROUND OF THE INVENTION

Vibration isolation members are frequently used in aircraft interior applications to reduce the vibration and noise exposure to delicate and sensitive instrumentation and also to passengers in the aircraft cabin. In aircraft applications the vibration isolation members must provide the requisite vibration reduction with a minimum size and weight vibration isolation member.

One means for effectively reducing such exposure to noise and vibration is to use a vibration isolation member that has iso-elastic stiffness properties. A vibration member that is iso-elastic has equal stiffness in the axial and radial directions. Iso-elastic stiffness permits the vibration isolator to provide dependable performance in any orientation and maximize vibration reduction for a given installation. A vibration isolation member that does not provide such iso-elastic stiffness properties will transmit vibration more efficiently in one or more directions, compared to an iso-elastic vibration member having the same minimum stiffness.

Additionally, it is desirable to include a mount fail-safe feature that prevents the mount from separating in the event the mount fails under loading. Several prior art mounts provide fail safe features that function in a single axial direction however, such prior art mounts typically do not have two fail safe paths. Moreover, in vibration isolation members that comprise iso-elastic members, the members frequently do not have a fail-safe or interference path that is defined by the components that comprise the mount. Rather the fail-safe feature is produced by adding washers or other discrete mechanical members to the member. The additional components required to provide a fail safe feature in an iso-elastic vibration isolation member add weight and increase the volume required to house the member in the aircraft.

The foregoing illustrates limitations known to exist in present devices and methods. Thus, it is apparent that it would be advantageous to provide a vibration isolator that provides iso-elastic stiffness in combination with fail safe feature and thereby solves one or more of the shortcomings of present isolation devices and methods. Accordingly, a suitable vibration isolation member is provided including features more fully disclosed hereinafter.

SUMMARY OF THE INVENTION

In one aspect of the present invention this is accomplished by providing a vibration isolation member that provides iso-elastic stiffness and at least one fail-safe feature.

More specifically the vibration isolation member of the present invention comprises an inner member comprising an outer periphery having a first dimension; an outer member comprising a base and a shroud that extends away from the base, the shroud adapted to overlay the inner member, said shroud defining an inner periphery having a second dimension, the second dimension being less than the first dimension; and a resilient member constrained between the shroud and the inner member, whereby the vibration isolation member provides iso-elastic stiffness and an interference between the inner and outer members in the event of a failure of the resilient member.

The inner member is unitary and is comprised of a stem and a seat where the seat includes a first surface, a second surface spaced from the first surface and a third surface that joins the first and second surfaces. The third surface is oriented at an angle relative to the first surface. The seat has a frustoconical configuration.

The outer member shroud may comprise a single segment or may comprise a first segment, a second segment and a third segment, the second segment joining the first and third segments. The outer member first segment is oriented substantially axially, the third segment is oriented substantially radially and the second segment is oriented at an angle relative to the first and second segments. The third surface of the seat is substantially parallel to the second segment of the shroud.

The foregoing and other aspects will become apparent from the following detailed description of the invention when considered in conjunction with the accompanying drawing figures.

BRIEF DESCRIPTION OF THE DRAWINGS

FIG. 4 is a longitudinal sectional view like the sectional view of FIG. 3 illustrating a second embodiment vibration isolation member of the present invention.

FIG. 5 is a longitudinal sectional view like the sectional view of FIG. 3 illustrating third embodiment vibration isolation member of the present invention.

DETAILED DESCRIPTION OF THE PREFERRED EMBODIMENT

Figure 2:
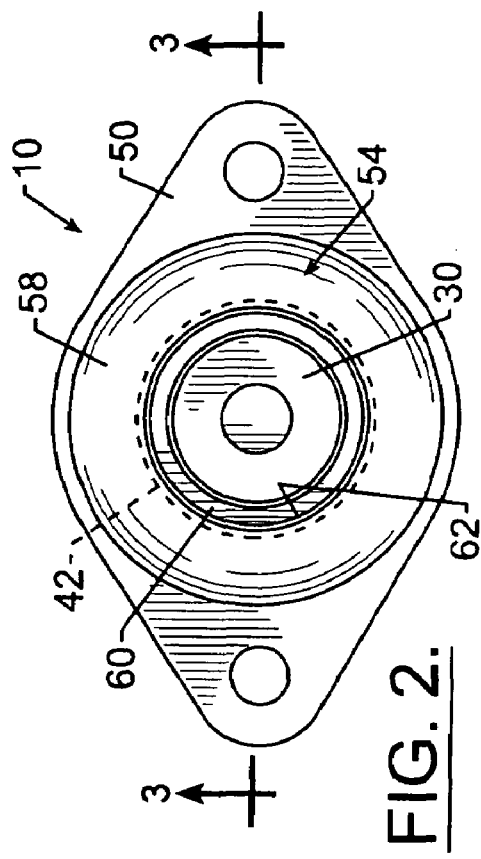
FIG. 2 is a top view of the vibration isolation member of FIG. 1.
Figure 1:
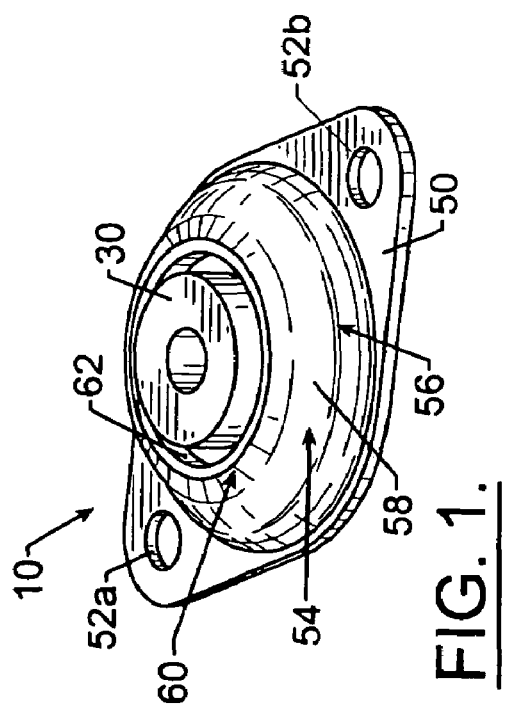
FIG. 1 is an isometric view of the vibration isolation member of the present invention.
Figure 3:
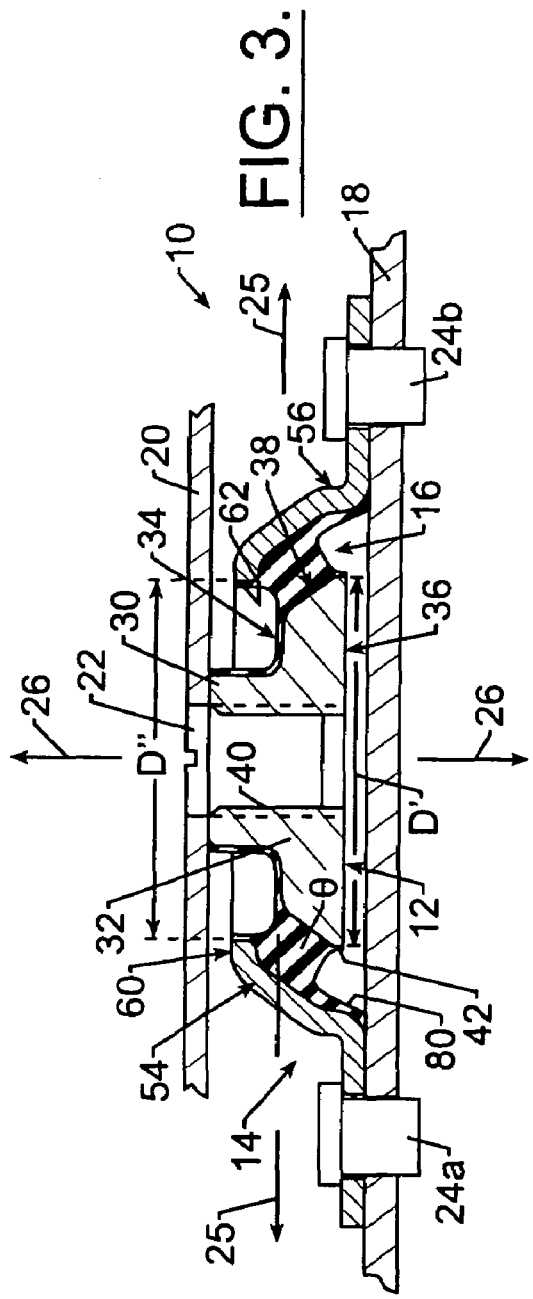
FIG. 3 is a longitudinal sectional view taken along line 3-3 of FIG. 2.

Turning to the drawing Figures wherein like parts are referred to by the same numbers in the Figures, the first embodiment vibration isolation member 10 of the present invention is disclosed in FIGS. 1, 2 and 3.

Generally, vibration isolation member 10 comprises an inner member 12, an outer member 14 and a resilient member 16 that joins the inner and outer members. The resilient member is constrained between the inner and outer members. The inner and outer members 12 and 14 are relatively rigid. The vibration isolation member 10 is made from a conventional molding process well known to those skilled in the art and during the molding process the resilient member is bonded to the inner and outer members. The resilient member 16 may be comprised of any suitable material however for purposes of the preferred embodiment of the invention the resilient member is comprised of a silicone or a synthetic rubber.

As shown in the sectional view of FIG. 3, the isolator is adapted to be connected between a support structure 18 such as an aircraft frame for example, and a suspended body 20 which may be an interior aircraft instrument or trim panel. The isolator 10 of the present invention reduces the transmission of vibratory disturbances, which may be in the form of acoustic noise, between the support structure 18 and the suspended body 20. The isolator also limits heat transfer between body 20 and structure 18. Also shown in FIG. 3, the isolation member is joined to the suspended body 20 by conventional fastener 22 that extends between the body 20 and inner member 12; and is joined to the support structure 18 by fasteners 24*a*, 24*b* that extend through the outer member 14. The fasteners may be comprised of any suitable fastener well known to those skilled in the art including, but not limited to screws or quick-connect fasteners. By these connections, the outer member 14 remains substantially stationary during use and the inner member 12 may be displaced in radial and axial directions represented by respective directional arrows 25 and 26.

The relatively rigid inner member 12 is unitary and comprises an axially extending cylindrical stem 30 and frustoconical seat 32. As shown in FIG. 3, the seat includes first and second faces 34 and 36 joined by angled surface 38 that extends outwardly from face 34 to face 36. The surface 38 may extend at any suitable angle, Θ relative to face 34. For purposes of describing the preferred embodiment of the invention, the angle may be about 55°. The stem is made integral with the seat 32 at face 34 and the free end of the stem extends outwardly from the opening in the outer member 14 defined by inner periphery 62. Faces 34 and 36 are circular, planar members that join the surface 38 at respective outer edges. The inner member includes an axially extending bore 40 that extends through the stem and seat and is adapted to receive fastener 22 previously described above. The seat defines an outer periphery 42 that comprises a diameter, D'. The extent of the inner member outer periphery 42 is also represented in dashed font in FIG. 2. As shown in FIG. 3, when the member 10 is installed the seat is located proximate the support member 18. Additionally, as shown in FIG. 3, the surface 36 is located a distance away from the support structure 18 to allow for displacement of inner member 12 when the isolation member 10 experiences a vibratory disturbance.

The relatively rigid outer member 14 is unitary and comprises a substantially planar flange or base 50 with bores 52*a* and 52*b* that are adapted to receive fasteners 24*a* and 24*b* as described hereinabove. The base 50 is made integral with an annular shroud 54 that overlays seat 32. The shroud comprises a first segment 56 that extends in the axial direction defined by arrow 26, a second segment 58 that extends substantially parallel to surface 38, and a third segment 60 that extends in the radial direction defined by arrow 25. The second segment 58 joins the first and third segments 56 and 60. See FIG. 3. Although the second segment is shown at an orientation that is substantially parallel to surface 38 it should be understood that although such a parallel configuration is preferred the second segment could be oriented at any relative angle and do not have to be parallel.

Third segment 60 terminates at inner periphery 62 that defines diameter, D". As shown in FIGS. 2 and 3, the outer periphery 42 has a diameter D' that has a greater radial dimension than inner periphery 62 diameter, D". In the event that resilient section fails, and the seat is displaced axially toward panel 20, an interference or fail-safe load path would be created between the seat and the segment 60 preventing further displacement of seat outward from the outer member. Thus the inner member would be captured by the outer member. As shown most clearly in the sectional view of FIG. 3, to ensure that the desired interference is produced between the seat and shroud, the inner periphery 62 must terminate radially inwardly from the outer periphery 42.

During molding, resilient member 16 is bonded to the surface 38 and also to the inner surface of second segment 58. Additionally, the molding process produces relatively thin skin segments bonded along the inner surface of third segment 60 and inner periphery 62, stem 30 and surface 34, outer periphery 42 and along portions of the inner surfaces of flange 50 and first segment 56. Apart from the skins, the main portion of the resilient member 16 has a substantially trapezoidal cross section.

The vibration isolation member 10 of the present invention provides iso-elastic stiffness. The term "iso-elastic" means that the isolation member 10 has substantially the same stiffness in the axial and radial directions for any applied load. Because the resilient member 16 is constrained between the inner member 12 and outer member 14 the resilient member 16 experiences combined shear loads and loads in either tension or compression regardless of the direction and magnitude of the load applied to the vibration isolation member 10.

The vibration isolation member 10 of the present invention provides a double fail safe feature that captures the inner member and maintains it in the chamber 80 defined by the outer member and the support structure 18. Failure of the elastomer member 16 or failure of the bonds between member 16 and either inner member 12 or outer member 14 will not permit the inner member to relocate outside of the outer member. The inner member is captured by either the structural panel 18 or by the interference between the seat and segment 60 as described hereinabove. Therefore, in order for the inner member seat to become displaced from the chamber 80, failure of the inner member, outer member fasteners or structural member must occur in addition to the resilient member failure. Additionally, in the event the resilient member 16 fails the seat will not be displaced out of chamber 80. The suspended body 20 will engage the rigid outer member while the seat will interfere with the inner member. Additionally, the structural member will impede additional axial displacement of the seat towards member 20. In this way, the mount of the present invention provides double fail-safe feature in combination with its iso-elastic stiffness.

A second preferred embodiment vibration isolation member 70 is shown in FIG. 4. The alternate embodiment mount 70 includes relatively rigid inner member 72 comprises stem 30 and seat 32 which defines angled surface 38. The stem 30, seat 32 and surface 38 as well as the other components and features are the same as those described hereinabove in conjunction with first embodiment vibration isolation member 10. In the second embodiment mount 70, the stem 30 and seat 32 may be made directly integral. The inner member 72 does not include surface 34 joining the stem and seat. The second embodiment member 70 includes the double fail-safe feature and also includes an iso-elastic stiffness.

A third preferred embodiment vibration isolation member 75 is illustrated in FIG. 5. The alternate embodiment mount 75 includes relatively rigid outer member 76 with shroud 78. As shown in FIG. 5, the shroud member is comprised of a hollow cone with a wall comprised of a single angled segment, that terminates at an inner periphery 62. As described in conjunction with first embodiment isolation member 10, the inner periphery 62 has a diameter D" that is less than the diameter D' of the outer periphery 42 of the seat 32. The other components and features of member 75 are the same as those described hereinabove in conjunction with first embodiment vibration isolation member 10. The third embodiment member 70 includes the double fail-safe feature and also includes an isoelastic stiffness.

It should be understood the use of outer member 76 and inner member 72 are not limited to the isolation members shown in their respective embodiments but rather, outer member 76 may be combined with inner member 72 if desired.

While I have illustrated and described a preferred embodiment of my invention, it is understood that this is capable of modification, and I therefore do not wish to be limited to the precise details set forth, but desire to avail myself of such changes and alterations as fall within the purview of the following claims.

I claim:

1. A single resilient member iso-elastic vibration isolation member comprising:
   (a) an inner member for attachment to a suspended body, said inner member comprising a frustoconical seat having an angled surface and an outer periphery diameter D';
   (b) an outer member for attachment to a planar support structure, said outer member comprising a planar base defining a base plane and a shroud that extends away from the planar base and said base plane, the shroud extending to overlay the inner member outer periphery diameter D', said shroud having an angled segment with an inner surface, said angled segment inner surface oriented substantially parallel to said angled surface of said frustoconical seat, said shroud defining an inner periphery diameter D", said inner periphery diameter D" less than said outer periphery diameter D', said inner member not extending through said outer member base plane; and
   (c) consisting essentially of a single sole resilient member constrained between the shroud angled segment inner surface and the inner member frustoconical seat angled surface, said single resilient member having a cross section, said single resilient member bonded to said shroud angled segment inner surface and said inner member frustoconical seat angled surface, wherein said single resilient member bonded to said shroud angled segment inner surface and said inner member frustoconical seat angled surface provides for iso-elastic displacement of said inner member in a radial direction and in an axial direction from said outer member with said frustoconical seat outer periphery diameter D' providing an interference with said shroud inner periphery diameter D" to prevent a seperation of the vibration isolation member in the event of a failure of said single resilient member, wherein said single sole resilient member is the sole resilient member providing for isolation between the suspended body and the support structure with said iso-elastic vibration isolation member providing a substantially equal dynamic stiffness in the radial direction and in the axial direction for an applied load between the suspended body and the support structure.

2. The vibration isolation member of claim 1 wherein the inner member is comprised of a stem.

3. The vibration isolation member as claimed in claim 1 said outer member forming a chamber with said planar support structure when attached to said planar support structure, said chamber containing said inner member seat.

4. The vibration isolation member as claimed in claim 1 wherein said inner member seat and said base plane are separated by a distance.

5. The vibration isolation member as claimed in claim 1 wherein the shroud is conical.

6. The vibration isolation member as claimed in claim 1 wherein the shroud is comprised of a single wall.

7. A combination comprising:
   (a) a planar support structure having a contiguous structure plane surface;
   (b) a suspended body located away from the support structure; and
   (c) a single resilient member iso-elastic vibration isolation member joining the support structure and the suspended body to reduce the transmission of vibratory disturbances between the suspended body and support structure, the vibration isolation member comprising;
      (i) an inner member comprising a frustoconical seat having an angled surface and an outer periphery diameter D';
      (ii) an outer member comprising a planar base and a shroud that extends away from the planar base, the shroud extending to overlay the inner member outer periphery diameter D', said shroud having an angled segment with an inner surface, said angled segment inner surface oriented substantially parallel to said angled surface of said frustoconical seat, said shroud defining an inner periphery diameter D", said inner periphery diameter D" less than said outer periphery diameter D', said outer member planar base joined to said planar support structure contiguous structure plane surface with said outer member shroud and said planar support structure contiguous structure plane surface comprising a chamber with the inner member seat contained in said chamber; and
      (iii) consisting essentially of a single sole resilient member constrained between the shroud angled segment inner surface and the inner member frustoconical seat angled surface, said single resilient member having a cross section, said single resilient member bonded to said shroud angled segment inner surface and said inner member frustoconical seat angled surface, wherein said single resilient member bonded to said shroud angled segment inner surface and said inner member frustoconical seat angled surface provides for iso-elastic displacement of said inner member in a radial direction and in an axial direction from said outer member with said frustoconical seat outer periphery diameter D' providing an interference with said shroud inner periphery diameter D" to prevent a seperation of the vibration isolation member in the event of a failure of said single resilient member wherein said single sole resilient member is the sole resilient member providing for isolation between the suspended body and the support structure with said iso-elastic vibration isolation member providing a substantially equal dynamic stiffness in the radial direction and in the axial direction for an applied load between the suspended body and the support structure.

8. The combination as claimed in claim 7 wherein the inner member includes a cylindrical stem.

9. The combination as claimed in claim 7 wherein said inner member seat does not extend into said support structure plane surface.

10. The combination as claimed in claim 9 wherein the support structure plane surface and said inner member seat are separated by a distance.

* * * * *